US008963961B2

(12) United States Patent
Werner et al.

(10) Patent No.: US 8,963,961 B2
(45) Date of Patent: Feb. 24, 2015

(54) FRACTAL WHITEBOARDING

(75) Inventors: Horst Werner, Muehlhausen-Rettigheim (DE); Olaf Wilde, Stutensee (DE)

(73) Assignee: SAP SE, Walldorf (DE)

( * ) Notice: Subject to any disclaimer, the term of this patent is extended or adjusted under 35 U.S.C. 154(b) by 544 days.

(21) Appl. No.: 12/981,043

(22) Filed: Dec. 29, 2010

(65) Prior Publication Data

US 2012/0169772 A1    Jul. 5, 2012

(51) Int. Cl.
*G09G 5/00*     (2006.01)
*G06F 17/00*    (2006.01)
*G06F 3/0481*   (2013.01)

(52) U.S. Cl.
CPC .......... *G06F 3/0481* (2013.01); *G09G 2340/04* (2013.01)
USPC ............................ 345/660; 345/619; 715/211

(58) Field of Classification Search
CPC ......... H04L 67/02; G06T 19/00; G06T 17/00; G06T 17/30994; G06T 3/04815; G06T 2203/04803
USPC ................................... 345/660, 619; 715/211
See application file for complete search history.

(56) References Cited

U.S. PATENT DOCUMENTS

| 8,091,030 | B1* | 1/2012 | Ballagh et al. | 715/738 |
| 2006/0070005 | A1* | 3/2006 | Gilbert et al. | 715/763 |
| 2009/0245654 | A1* | 10/2009 | Xing et al. | 382/203 |
| 2010/0033504 | A1* | 2/2010 | Hart et al. | 345/660 |
| 2010/0100866 | A1* | 4/2010 | Kamper et al. | 717/105 |
| 2010/0185959 | A1* | 7/2010 | Greene et al. | 715/757 |
| 2012/0022673 | A1* | 1/2012 | Heller et al. | 700/84 |

* cited by examiner

*Primary Examiner* — Devona Faulk
*Assistant Examiner* — Wynton S Jones
(74) *Attorney, Agent, or Firm* — Schwegman Lundberg & Woessner, P.A.

(57) ABSTRACT

In a system and a method, a first user input corresponding to a first graphical shape having first boundaries, a first size, and a first position is received on an initial virtual whiteboard having an infinite drawing area and occupying a display area of a user interface. In response to a first command, the first graphical shape is designated as a current virtual whiteboard by resizing the first graphical shape from the first size to a second size, with the second size being equal to the display area of the user interface, and with the first graphical shape having the first boundaries removed to effect an infinite drawing area within the first graphical shape. A second user input corresponding to a second graphical shape is received within the first graphical shape designated as the current virtual whiteboard. In response to a second command, the initial virtual whiteboard is designated as the current virtual whiteboard by restoring the first position and the first size of the first graphical shape within the initial virtual whiteboard and by resizing and re-positioning the second graphical shape to fit within the first graphical shape.

14 Claims, 12 Drawing Sheets

US 8,963,961 B2

FRACTAL WHITEBOARDING

TECHNICAL FIELD

This application relates generally to visual modeling, and specifically, to a system and method for fractal whiteboarding.

BACKGROUND INFORMATION

Visual models enable a human to grasp conveyed information quickly. The benefits of a visual model disappear however if too much information is exposed in the model at once. Visual models also may be misleading if the existing complexity of the topics they reflect are omitted.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

Figure 1:
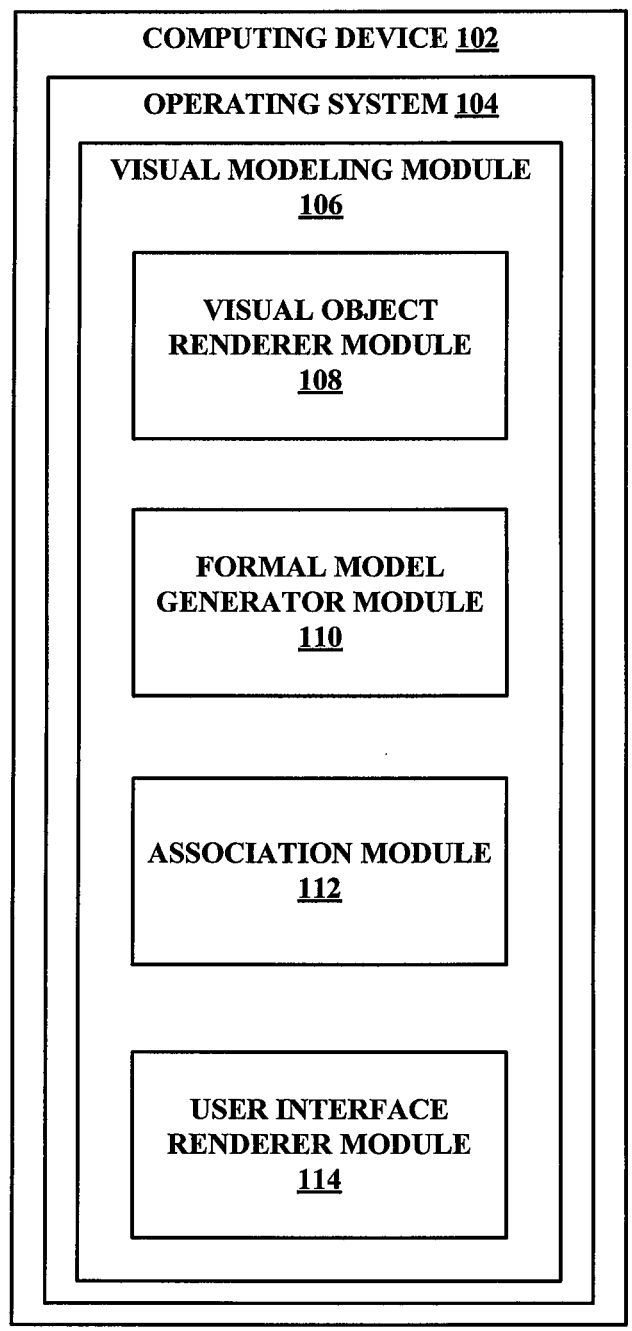
FIG. 1 is a block diagram illustrating an example embodiment of a collaborative tool module that is embodied in a computing device.

Various embodiments include at least one of a system, a method, and a non-transitory machine-readable medium with executable instructions stored thereon providing for fractal whiteboarding.

Some such embodiments enable a first user input corresponding to a first graphical shape having first boundaries, a first size, and a first position to be received on an initial virtual whiteboard having an infinite drawing area and occupying a display area of a user interface. In response to a first command, the first graphical shape may be designated as a current virtual whiteboard by resizing the first graphical shape from the first size to a second size, with the second size being equal to the display area of the user interface, and with the first graphical shape having the first boundaries removed to effect an infinite drawing area within the first graphical shape. A second user input corresponding to a second graphical shape may be received within the first graphical shape designated as the current virtual whiteboard. In response to a second command, the initial virtual whiteboard may be designated as the current virtual whiteboard by restoring the first position and the first size of the first graphical shape within the initial virtual whiteboard and by resizing and re-positioning the second graphical shape to fit within the first graphical shape.

In one example, a computer-implemented method is provided. The method comprises: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the method further comprises assigning, by the processor, the first graphical shape to represent a structured data object on the initial virtual whiteboard. In one example, the method further comprises displaying structured object properties in an editable data structure within the user interface display area of the initial virtual whiteboard, the editable data structure occupying a fixed location in the user interface display area; and recording the assigning of the first graphical shape to represent the structured data object in the editable data structure. In one example, the assigning of the first graphical shape to represent the structured data object comprises detecting a line drawn from the first graphical shape to an editable data structure representing the structured data object. In one example, the method further comprises: receiving a third user input corresponding to a third graphical shape on the initial virtual whiteboard; and based on a determination that the third graphical shape is hierarchically equal to the first graphical shape, assigning, by the processor, the third graphical shape to represent at least one of the structured data object and a second structured data object on the initial virtual whiteboard.

In one example, a computer-implemented method is provided. The method comprises: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the method further comprises: detecting a movement in the user interface display area of the initial virtual whiteboard of a third graphical shape from outside of the first graphical shape to inside of the first graphical shape; and recording the third graphical shape as a sub-element of the first graphical shape in an editable data structure that stores graphical shapes and relationships between the graphical shapes, the editable data structure occupying a fixed location in the user interface display area.

In one example, a computer-implemented method is provided. The method comprises: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the first user input is generated using a freeform drawing tool, and the first graphical shape corresponds to the first user input by comparing the first user input to stored visual objects and identifying a visual object most closely matching the first user input.

In one example, a non-transitory machine-readable medium is provided that stores instructions, which when executed by at least one processor, causes the at least one processor to perform operations comprising: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the operations further comprise assigning, by the processor, the first graphical shape to represent a structured data object on the initial virtual whiteboard. In one example, the operations further comprise displaying structured object properties in an editable data structure within the user interface display area of the initial virtual whiteboard, the editable data structure occupying a fixed location in the user interface display area; and recording the assigning of the first graphical shape to represent the structured data object in the editable data structure. In one example, the assigning of the first graphical shape to represent the structured data object comprises detecting a line drawn from the first graphical shape to an editable data structure representing the structured data object. In one example, the operations further comprise: receiving a third user input corresponding to a third graphical shape on the initial virtual whiteboard; and based on a determination that the third graphical shape is hierarchically equal to the first graphical shape, assigning, by the processor, the third graphical shape to represent at least one of the structured data object and a second structured data object on the initial virtual whiteboard.

In one example, a non-transitory machine-readable medium is provided that stores instructions, which when executed by at least one processor, causes the at least one processor to perform operations comprising: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the operations further comprise: detecting a movement in the user interface display area of the initial virtual whiteboard of a third graphical shape from outside of the first graphical shape to inside of the first graphical shape; and recording the third graphical shape as a sub-element of the first graphical shape in an editable data structure that stores graphical shapes and relationships between the graphical shapes, the editable data structure occupying a fixed location in the user interface display area.

In one example, a non-transitory machine-readable medium is provided that stores instructions, which when executed by at least one processor, causes the at least one processor to perform operations comprising: receiving a first user input corresponding to a first graphical shape having first boundaries, a first size, and a first position on an initial virtual whiteboard having an infinite drawing area and occupying a display area of a user interface; in response to a first command, designating, by a processor, the first graphical shape as a current virtual whiteboard, comprising: resizing, by the processor, the first graphical shape from the first size to a second size, the second size being equal to the display area of the user interface, the first graphical shape having the first boundaries removed to effect an infinite drawing area within the first graphical shape; receiving a second user input corresponding to a second graphical shape within the first graphical shape designated as the current virtual whiteboard; and in response to a second command, designating the initial virtual whiteboard as the current virtual whiteboard, comprising: restoring the first position and the first size of the first graphical shape within the initial virtual whiteboard; and resizing and re-positioning the second graphical shape to fit within the first graphical shape. In one example, the first user input is generated using a freeform drawing tool, and the first graphical shape corresponds to the first user input by comparing the first user input to stored visual objects and identifying a visual object most closely matching the first user input.

In one example, a system is provided comprising: a processor-implemented visual object renderer module configured to receive a first user input corresponding to a first graphical shape having first boundaries, a first size, and a first position on an initial virtual whiteboard having an infinite drawing area and occupying a display area of a user interface; and a processor-implemented user interface renderer module configured to designate the first graphical shape as the current virtual whiteboard in response to a first command, comprising: resizing the first graphical shape from the first size to a second size, the second size being equal to the display area of the user interface, the first graphical shape having the first boundaries removed to effect an infinite drawing area within the first graphical shape, the processor-implemented visual object renderer module further configured to receive a second user input corresponding to a second graphical shape within the first graphical shape designated as the current virtual whiteboard, and the processor-implemented user interface renderer module further configured to designate the initial virtual whiteboard as the current virtual whiteboard in response to a second command, comprising: restoring the first position and the first size of the first graphical shape within the initial virtual whiteboard; and resizing and re-positioning the second graphical shape to fit within the first graphical shape. In one example, the system further comprises a processor-implemented association module configured to assign the first graphical shape to represent a structured data object on the virtual whiteboard user interface. In one example, the system further comprises further comprising a processor-implemented formal model generator module configured to: generate an editable data structure for displaying structured object properties on the virtual whiteboard user interface, the editable data structure occupying a fixed location in the virtual whiteboard user interface, wherein the processor-implemented association module is further configured to record the assigning of the first graphical shape to represent the structured data object in the editable data structure. In one example, the processor-implemented association module is configured to assign of the first graphical shape to represent the structured data object by detecting a line drawn from the first graphical shape to an editable data structure representing the structured data object. In one example, wherein the processor-implemented visual object renderer module is further configured to receive a third user input corresponding to a third graphical shape on the initial virtual whiteboard, and wherein the processor-implemented association module is further configured to assign the third graphical shape to represent at least one of the structured data object and a second structured data object on the initial virtual whiteboard based on a determination that the third graphical shape is hierarchically equal to the first graphical shape.

In one example, a system is provided comprising: a processor-implemented visual object renderer module configured to receive a first user input corresponding to a first graphical shape having first boundaries, a first size, and a first position on an initial virtual whiteboard having an infinite drawing area and occupying a display area of a user interface; and a processor-implemented user interface renderer module configured to designate the first graphical shape as the current virtual whiteboard in response to a first command, comprising: resizing the first graphical shape from the first size to a second size, the second size being equal to the display area of the user interface, the first graphical shape having the first boundaries removed to effect an infinite drawing area within the first graphical shape, the processor-implemented visual object renderer module further configured to receive a second user input corresponding to a second graphical shape within the first graphical shape designated as the current virtual whiteboard, and the processor-implemented user interface renderer module further configured to designate the initial virtual whiteboard as the current virtual whiteboard in response to a second command, comprising: restoring the first position and the first size of the first graphical shape within the initial virtual whiteboard; and resizing and re-positioning the second graphical shape to fit within the first graphical shape. In one example, the processor-implemented visual object renderer module is further configured to detect a movement in the user interface display area of the initial virtual whiteboard of a third graphical shape from outside of the first graphical shape to inside of the first graphical shape, wherein the processor-implemented association module is further configured to record the third graphical shape as a sub-element of the first graphical shape in an editable data structure that stores graphical shapes and relationships between the graphical shapes, the editable data structure occupying a fixed location in the user interface display area.

FIG. 1 is a block diagram of an example embodiment of a visual modeling module that is embodied in a computing device. It should be appreciated that the computing device 102 may be deployed in the form of, for example, a personal computer, a laptop computer, a server computer, a tablet computer, a smart phone, a personal digital assistant, or other computing devices. In various embodiments, the computing device 102 may be used to implement computer programs, logic, applications, methods, processes, or software to graphically manipulate data objects, as described in more detail below.

Referring to FIG. 1, the computing device 102 may execute an operating system 104 that manages other software processes and/or services executing on the computing device 102. In an example embodiment, the software processes and/or services may include a visual modeling module 106, which allows users to visually convey data and data relationships and provides various structures and tools used in modeling, brainstorming, and other decision making processes. The visual modeling module 106 may include a visual object renderer module 108, a formal model generator module 110, an association module 112, and a user interface renderer module 114. Each of the modules of the visual modeling module 106 may be implemented by one or more processors of the computing device 102 or embodied in hardware, firmware, or any combination thereof. The modules illustrated in FIG. 1 may interface with a database (not shown) to store and/or retrieve visual models, graphical elements, or data objects, among other things.

The visual object renderer module 108 may receive data input by a user in the form of a graphical shape, either drawn free form or using a drawing tool, in a graphical user interface. It should be appreciated that a graphical shape may include enclosed shapes (e.g., square, circle) as well as lines, dots, and other visual elements. The visual object renderer module 108 may interpret and translate the input data into a recognized graphical shape. The visual object renderer module 108 may compare the input data to recognized graphical shapes to identify the graphical shape most closely resembling the input data. The comparison may entail transmitting the input data to a database for comparison via a query or retrieval of recognized graphical shapes for comparison at the computing device 102. The visual object renderer module 108 may render the recognized enclosed graphical shape in the graphical user interface in substantially the same size and dimensions as the input data.

The formal model generator module 110 may generate a data object having a set of object properties. A "property," as used herein, may refer to a characteristic of a data object. In an example embodiment, a property may include at least one association and at least one attribute. An "association" may refer to a connection or relationship between two or more data objects. An "attribute" may refer to a quality or feature belonging to one or more data objects. Examples of attributes may include size, shape, color, category, and other attributes. It should be appreciated that in addition to the database (not shown), the data objects and/or properties associated with the data objects may also be stored in other files, such as an Extensible Markup Language (XML) document, spreadsheet, or other files.

In an example embodiment, the formal model generator module 110 may generate a data object in response to the rendering or generation of a visual object. In this example embodiment, the generated data object may correspond to the visual object. In other words, the visual object is associated with the data object and its set of object properties. In another example embodiment, the formal model generator module 110 may generate a data object with a set of object properties not in response to the generation of a visual object. One or more visual objects, either pre-existing or generated subsequent to the data object, may be associated with the data object. The data object may list its set of properties in an editable "fact sheet" that permits a user to enter attribute values for the data object. Individual properties in the editable "fact sheet" also may be selected and associated with visual objects.

The association module 112 may associate visual objects to data objects in the graphical user interface. For example, a data object represented by a fact sheet may be associated with one or more visual objects. The association module 112 may record or store this association. Individual properties of a data object fact sheet may be associated with one or more visual objects as well. The association module 112 also may record or store associations on a property level. The associations may be stored in a database (not shown) or other file, such as an XML file or spreadsheet. The association module 112 also may associate graphical shapes with each other in a hierarchical relationship. In an example embodiment, a visual model may be created as a hierarchical structure of visual objects nested or embedded within each other.

In an example embodiment, the associations between data objects and visual objects may change. For example, a user may decide to disassociate a visual object from a data object. A user may decide to nest or embed a visual object within another visual object, thereby potentially changing data dependencies and hierarchical associations between the two visual objects. In each case, the association module 112 may record and store changes in the associations. The association module 112 also may recursively apply the manipulation (e.g., movement, resizing) of a visual object to all children objects.

The user interface renderer module 114 may render a graphical user interface that permits the input of data pertaining to graphical shapes. In an example embodiment, the user interface renderer module 114 may render a graphical user interface that serves a virtual whiteboard that enables visual data to be "drawn" or entered on the user interface. Working with the other modules of the visual modeling module 106, the user interface renderer module 114 may render and display enclosed graphical shapes, data object fact sheets or side bars and other objects and tools used to interact with the virtual whiteboard. The user interface renderer module 114 may respond to user actions taken with respect to one or more virtual whiteboard tools. For example, the user interface renderer module 114 may render a zoomed in virtual whiteboard in response to a zoom in command. In another example embodiment, the user interface renderer module 114 may render a visual object as a whiteboard itself based upon a designation of the visual object as a whiteboard.

In addition to the visual modeling module 106, one or more of the visual object renderer module 108, formal model generator module 110, association module 112, and user interface renderer module 114 may be embodied in a variety of other applications or services. It should be appreciated that in other example embodiments, the computing device 102 may include fewer, more, or different modules apart from those shown in FIG. 1.

Figure 2A:
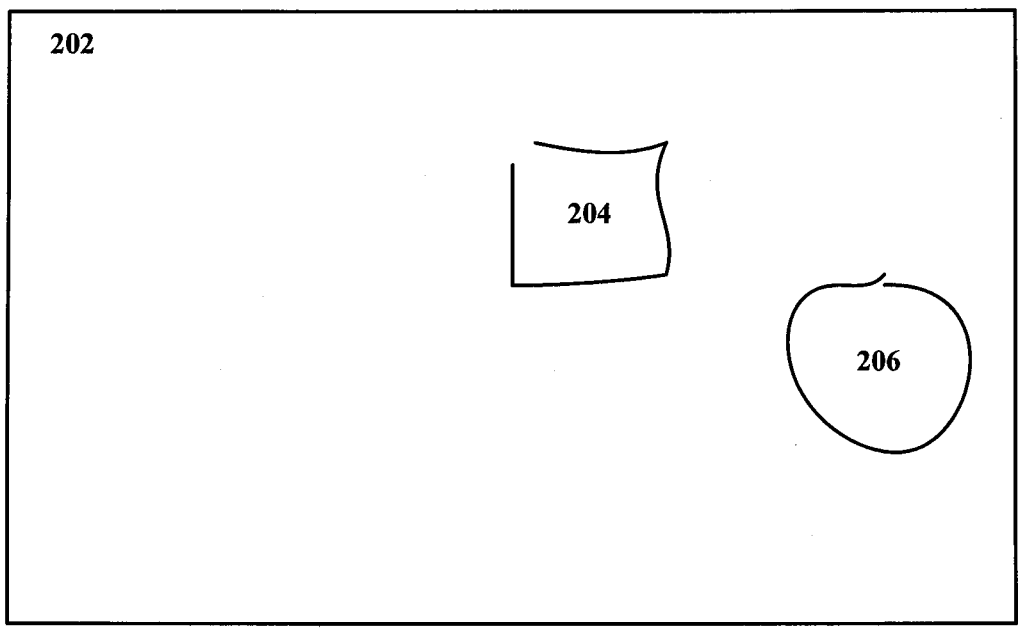
FIG. 2A is a diagram of an example embodiment of a graphical user interface that illustrates the creation of an enclosed graphical shape.

FIGS. 2A-D illustrate example embodiments of a visual modeling user interface that may receive data input, render visual objects, and associate visual objects with data objects and their properties. Referring to FIG. 2A, a diagram of an example embodiment of a graphical user interface illustrates the creation of an enclosed graphical shape. A user may interact with the graphical user interface via a visual modeling application or virtual whiteboard application. Using a tool, such as a free-form drawing tool, the user may input data pertaining to a graphical shape. In the example embodiment of FIG. 2A, the user may draw a square 204 and a circle 206 on the virtual whiteboard. It is contemplated that any shape, line, symbol, text, or other drawing may be input to the virtual whiteboard user interface by a user. Further, it is contemplated that any drawing tool may be used. A user interacting with the visual modeling application or virtual whiteboard application may use any input device, such as a mouse, a stylus, a finger, or a keyboard. The virtual whiteboard may be a virtual drawing area that has no boundaries. A user-controlled viewport, in one example in the form of the displayable area of the virtual whiteboard, may display an area of any position and size within the drawing area.

Figure 2B:
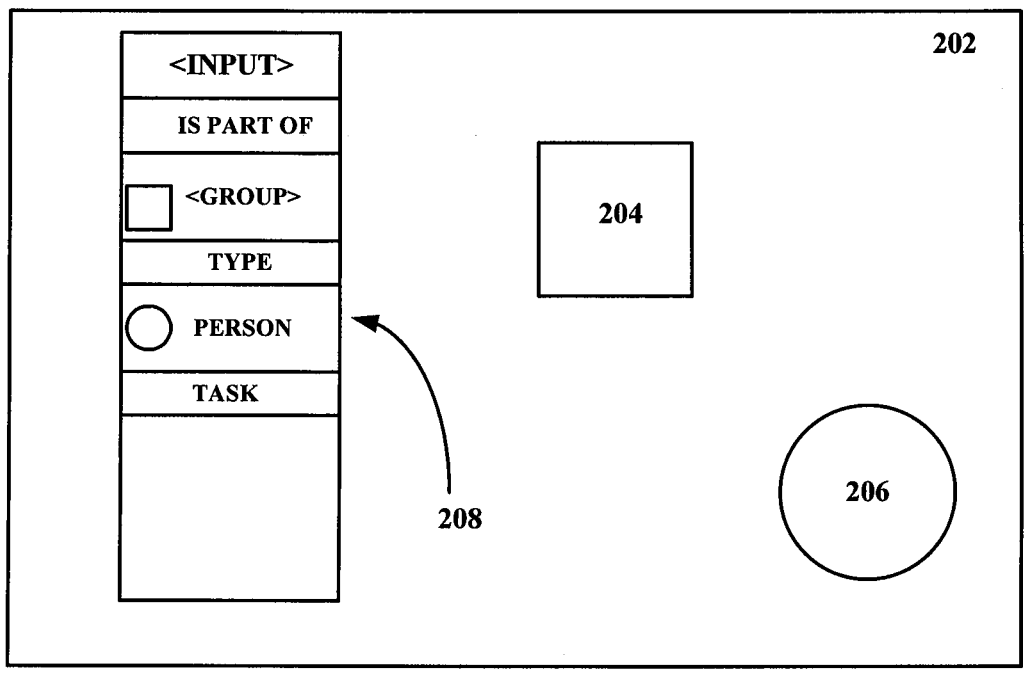
FIG. 2B is a diagram of an example embodiment of a graphical user interface that illustrates a set of properties that may be associated with a group of visual objects.

FIG. 2B is a diagram of an example embodiment of a graphical user interface that illustrates a set of properties that may be associated with a group of visual objects. Referring to FIG. 2B, a virtual whiteboard user interface 202 may display one or more enclosed graphical shapes input by the user. A square 204 may be recognized and rendered by the virtual whiteboard based on a hand drawn square 204 depicted in FIG. 2A. Similarly, a circle 206 may be recognized and rendered by the virtual whiteboard based on a hand drawn circle 206 depicted in FIG. 2A. A fact sheet 208 listing a set of object properties for a formal model of an object may be created and displayed in the virtual whiteboard 202. In an example embodiment, the fact sheet 208 may be created in response to the drawing of an enclosed graphical shape. In other example embodiments, the fact sheet 208 may be created independently of any enclosed graphical shape. In an example embodiment, the fact sheet may be a side bar that is anchored to one of the sides of the virtual whiteboard.

The fact sheet 208 may include a set of properties, such as a title, a group to which the object described by the fact is a member, a type of object, and one or more tasks or visual objects assigned to the object. The properties listed in the fact sheet 208 may be editable. The properties also may recognize and reflect changes in the virtual whiteboard 202. Visual objects may be dragged and dropped or otherwise moved to and from the fact sheet 208.

Figure 2C:
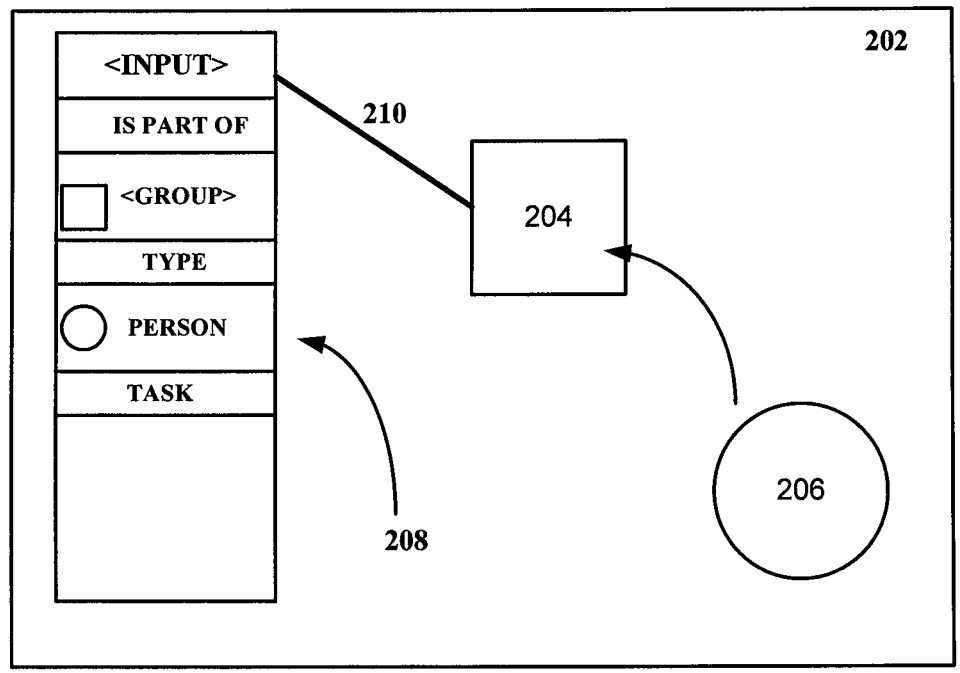
FIG. 2C is a diagram of an example embodiment of a graphical user interface that illustrates an association of properties to an enclosed graphical shape.

FIG. 2C is a diagram of an example embodiment of a graphical user interface that illustrates an association of properties to an enclosed graphical shape. Referring to FIG. 2C, the square 204 depicted in FIGS. 2A and 2B may be associated with the fact sheet 208 by a line 210 drawn between the square 204 and the fact sheet 208. The line may indicate an association or relationship between the visual object and the formal object model. In other words, the square may be tied to the object properties described in the fact sheet 208 such that the square is the visual representation of the data object represented by the fact sheet 208 and vice versa. The virtual whiteboard 202 may recognize a line or other visual indicator to be an indicator of association or a relationship between a visual object and a formal object model.

FIG. 2C also illustrates the capability of the virtual whiteboard to hierarchically represent data objects and visual objects. In an example embodiment, the circle 206 may be moved into the square 204 using a technique such as drag-and-drop, whereby the circle 206 is selected and dragged into the square 204. The significance of dragging and dropping the circle 206 into the square 204 is that the circle 206 is placed at a hierarchy one level below that of the square 204. In other words, the circle 206 becomes a sub-element or dependent of the square 204. This relationship may be reflected in the fact sheet 208. For example, if a circle 206 represents a person, the placement of the circle 206 in the square 204 may represent that the person is part of the group represented by the square 204.

Figure 2D:
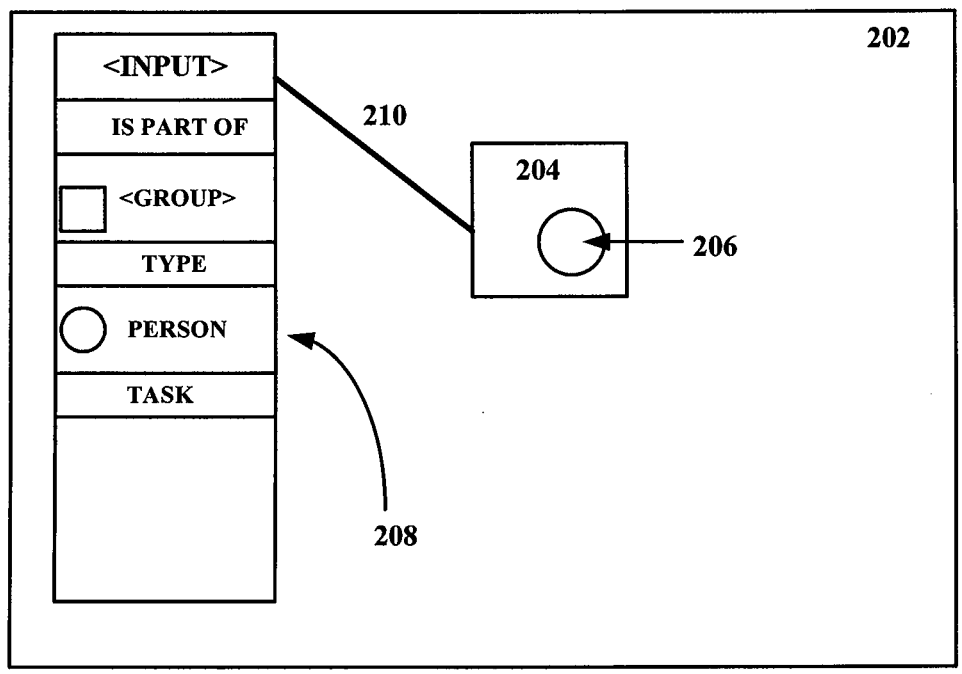
FIG. 2D is a diagram of an example embodiment of a graphical user interface that illustrates a creation of a graphical item within an enclosed graphical shape.

FIG. 2D is a diagram of an example embodiment of a graphical user interface that illustrates a creation of a graphical item within an enclosed graphical shape. Referring to FIG. 2D, the hierarchical relationship or dependency between the square 204 and the circle 206 is illustrated. The virtual whiteboard may automatically re-size the dimensions of a visual object in response to a change in the nature of the relationship or hierarchy of the visual object. For example, placing the circle 206 within the square 204 results in the shrinking of the circle 206 to indicate that the circle 206 is an element of the square 204. The binding of the square 204 to the fact sheet 208 also may be shown by the line 210 connecting the square 204 and the fact sheet 208. Thus, the virtual whiteboard may facilitate the presentation of information graphically, while offering the ability to tie or bind graphically presented information to structured data objects.

Figure 3A:
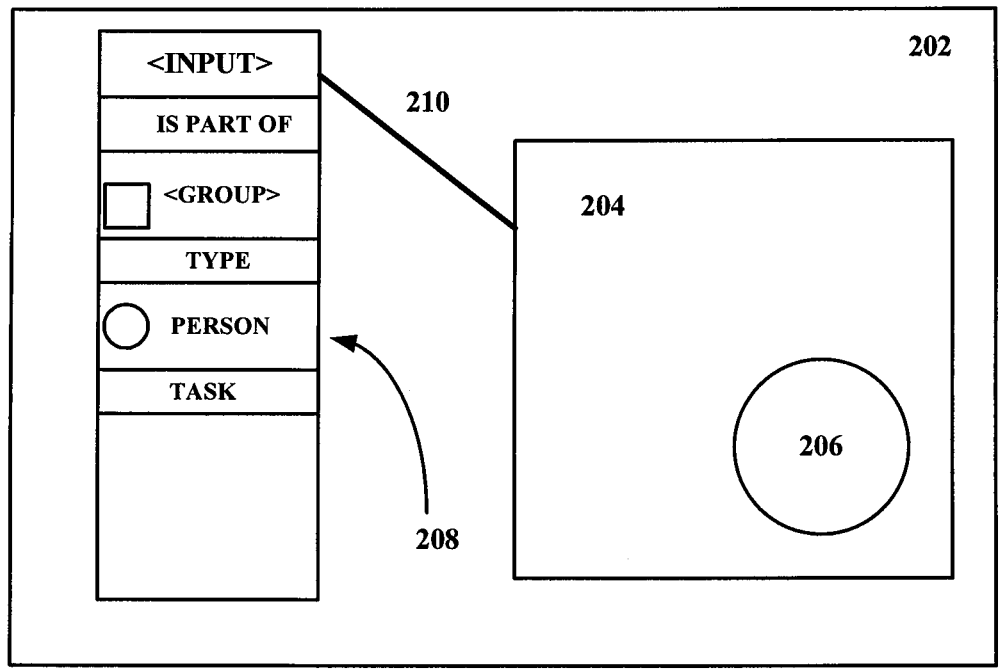
FIG. 3A is a diagram of an example embodiment of a graphical user interface that illustrates an enlarged or zoomed in view of visual objects.

FIGS. 3A-E illustrate example embodiments of visual modeling user interfaces that support a hierarchical visualization and association of visual objects and visual modeling options. FIG. 3A is a diagram of an example embodiment of a graphical user interface that illustrates an enlarged or zoomed in view of visual objects. FIG. 3A continues the example embodiment of FIGS. 2A-D. As shown, a virtual whiteboard 202 may display a fact sheet 208 listing a set of object properties. The fact sheet 208 is tied to a square 204 by a connector line 210 indicating that the square 204 contains the properties listed in the fact sheet 208. The square 204 is a visual object drawn by a user and rendered by the virtual whiteboard 202. The square 204 may include a sub-element in the form of a circle 206. The presence of the circle 206 inside the square 204 may indicate that a hierarchical relationship exists between the two visual objects. The square 204 may be considered the parent object and the circle 206 may be considered the child object. The visual modeling module 106 may be implemented as a tree structure of visual objects where each object contains its position relative to the parent and its size in a coordinate system defined by a current reference object. The current reference object may be a visual object on the virtual whiteboard that is selected by a user.

When the parent object is moved, the coordinates of the children objects do not need to be updated. Instead, the rendering of the current drawing area is performed by recursively calling the render method for each child object, where in each of the recursive calls, accumulated parent offsets in the x and y directions are passed as a parameter so that the child position on the screen may be correctly calculated. In an example embodiment, children objects may be rendered if they exceed a certain size (e.g., 1 pixel, 5 pixels) in the current scaling.

The pixel coordinates of a child object to be drawn on the screen may be calculated as (position+accumulated parent offset−view port offset)*current scale. When a user snaps into or selects a child object, the view port offset is set to the child position and the zoom scale is set to the child width divided by the pixel width of the physical drawing area. The child may then become the current reference object.

When a user moves or resizes the view port after the "snap in," the view port coordinates and scale, as calculated relative to the reference object, may be changed correspondingly. Thus, children objects may be moved to negative coordinates relative to the parent object or beyond the height or width of the parent object. When a user triggers a "snap out" or de-selection of the child object, the minimal and maximal x and y coordinates over all children objects are calculated. The positions and sizes of all children may be multiplied by a scale factor that is calculated as S=min (parentwidth/(maxchildx−minchildx), parentheight/(maxchildy−minchildy)). The offset may be calculated as (−minchildx, −minchildy). This transformation may enable all children objects to fit in the parent object area. The reference object's parent may then become the reference object.

Referring to FIG. 3A, a virtual whiteboard supporting a zoom in functionality is illustrated. The user may use a zoom tool (not shown) provided by the virtual whiteboard to zoom in on the virtual whiteboard. The zoom tool may be particularly useful in the event of multiple layers of hierarchy among visual objects, wherein each successive hierarchical layer becomes progressively smaller in depiction.

Figure 3B:
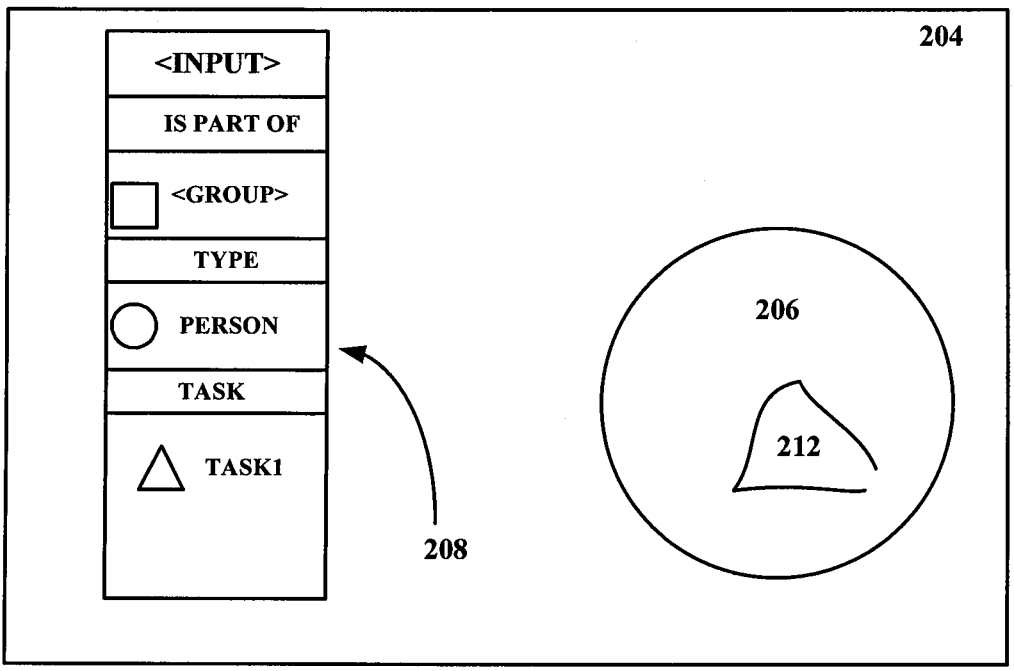
FIG. 3B is a diagram of an example embodiment of a graphical user interface that illustrates a visual object serving as a whiteboard.

FIG. 3B is a diagram of an example embodiment of a graphical user interface that illustrates a visual object serving as a whiteboard. Referring to FIG. 3B, the boundaries of the square 204 previously depicted in FIGS. 2A-D and 3A are no longer visible. In an example embodiment, the virtual whiteboard may support the selection of a visual object and the designation of the selected visual object as a current whiteboard. In other words, the square 204 may be selected by a user using a user input device as the virtual whiteboard. In an example embodiment, the user may trigger the square 204 to "snap in" to the view port (e.g., the displayable area of the visual whiteboard"). The view port may be moved and re-sized to match the square's 204 boundaries, such that the boundaries may disappear from view. As a result, the square 204 itself may be used as an infinite layout area. The user may thus draw additional graphical shapes and make associations or relationships between visual and formal data objects within the square 204.

For example, FIG. 3B illustrates that a user has drawn a shape resembling a triangle 212 inside of the circle 206 and within the square 204 serving as the virtual whiteboard. In an example embodiment, the square 204 serving as the virtual whiteboard has been zoomed in such that the boundaries of the square 204 are no longer visible. It should be appreciated that the square 204 or any other enclosed graphical shape may be designated as a virtual whiteboard without zooming in on the shape.

Conventional visual models may support zooming up to a certain resolution limit (e.g., a maximum zoom level) by scaling or changing the logical coordinates of an object and the physical coordinates of the pixels representing the object. At a certain point, zooming in on an object may no longer be feasible as a computing device will not be able to tell two locations apart from each other that are very close together because the dimensions will be below the floating-point capabilities of the computing device. In contrast, the virtual whiteboard may provide unlimited zoom in capabilities. Each visual object displayed on the virtual whiteboard may have a certain dimension or size, whether expressed in units, pixels, or any other unit of measure. When a visual object is selected, the visual object may snap in to the view port and serve as a virtual whiteboard itself. The user interface renderer module 114 and the visual object renderer module 108 may re-scale the logical coordinates of other dependent visual objects relative to the virtual whiteboard representation of the visual object. Thus, the computing device 102 will never reach its resolution limits and will always be in an area that the computing device can handle with logical coordinates.

In the example embodiment of FIG. 3B, whereas the logical dimensions of the square 204 may have previously been 2 units wide by 2 units high, snapping in or zooming in on the square 204 may cause the physical boundaries of the square 204 to disappear (by virtue of the square 204 occupying the entire view port. Thus, there exist no boundaries to the area a user may introduce new visual objects, and the virtual whiteboard will treat the square as an infinite drawing area. The coordinates and dimensions of existing objects located within the square 204, such as the circle 206, may be re-scaled to reflect the zoomed in nature of the virtual whiteboard, while still preserving the ability of the computing device 102 to zoom in further.

Figure 3C:
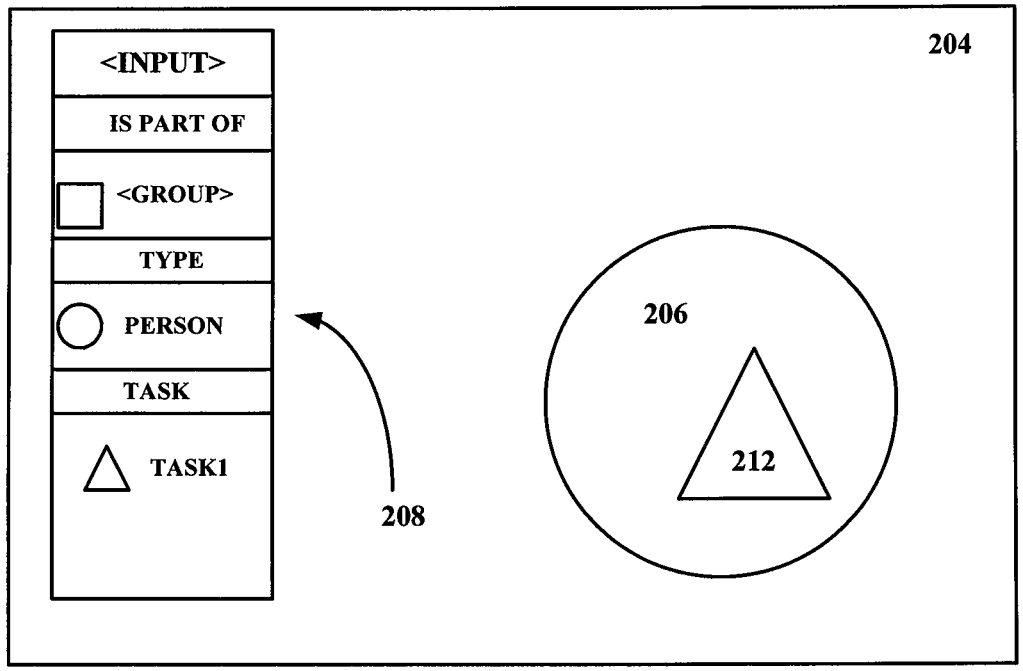
FIG. 3C is a diagram of an example embodiment of a graphical user interface that illustrates the creation of a graphical item within an enclosed graphical shape.

FIG. 3C is a diagram of an example embodiment of a graphical user interface that illustrates the creation of a graphical item within an enclosed graphical shape. Referring to FIG. 3C, a triangle 212 drawn in the virtual whiteboard that is the square 204 may be recognized and rendered by the visual object renderer module 108. In the example embodiment of FIG. 3C, the triangle may represent a task. Given that fact sheet 208 is linked to square 204, the fact sheet 208 may record the association between the rendered triangle 212 and the square 204. In particular, the fact sheet 208 may record that the triangle 212 representing a task is subsumed within the square 204. In other words, the group represented by the square 204 may be assigned to the task 212.

Figure 3D:
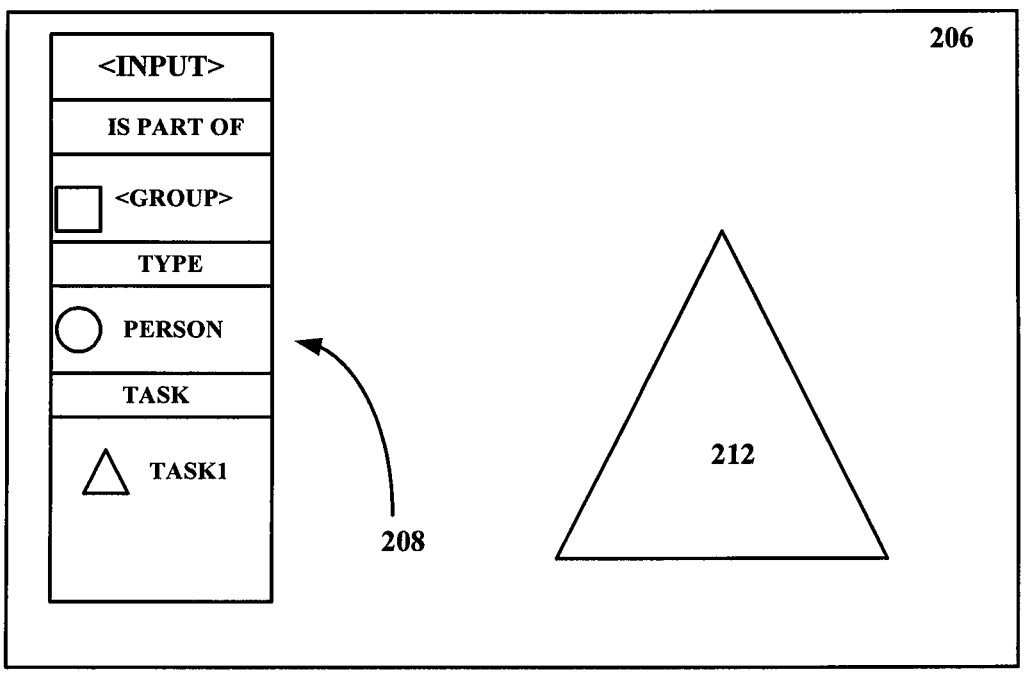
FIG. 3D is a diagram of an example embodiment of a graphical user interface that illustrates an enlarged or zoomed in view of visual objects.

FIG. 3D is a diagram of an example embodiment of a graphical user interface that illustrates an enlarged or zoomed in view of visual objects. Referring to FIG. 3D, a user may select circle 206 to serve as a virtual whiteboard. The visual modeling module 106 may re-size the circle 206 such that the circle 206 occupies the entire view port. The boundaries of the circle 206 thus may disappear, leaving the user with an infinite drawing area within the circle 206. As part of the re-sizing of the circle 206, the visual modeling module 106 may adjust the size and scale of any children objects contained within the circle 206. In the example embodiment of FIG. 3D, the triangle 212 may be re-sized to reflect the zoomed in resolution of the virtual whiteboard.

Figure 3E:
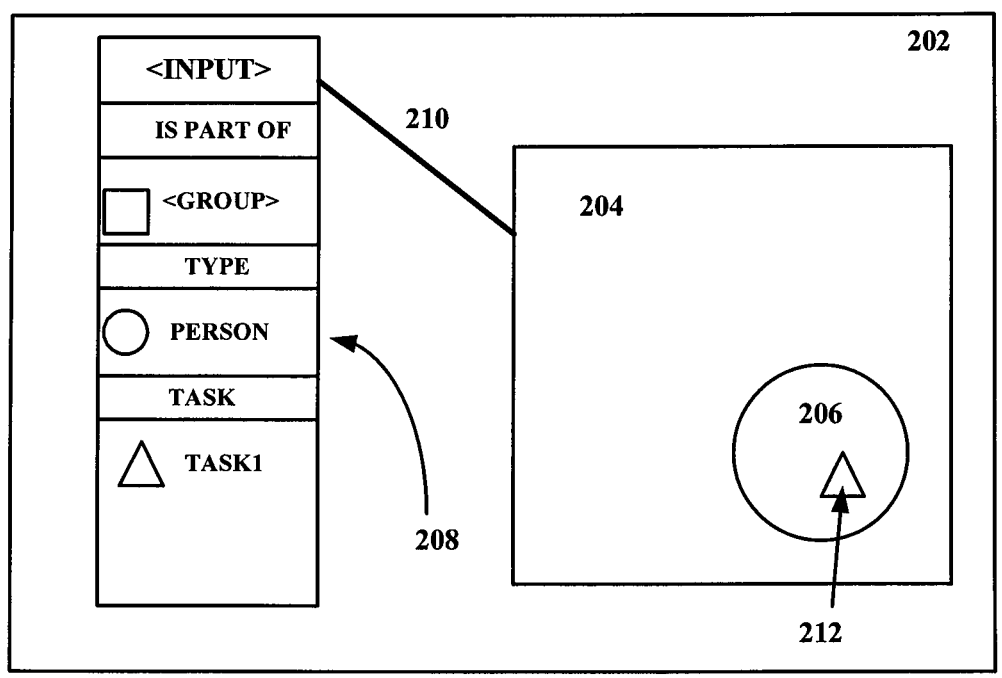
FIG. 3E is a diagram of an example embodiment of a graphical user interface that illustrates a reduced or zoomed out view of visual objects.

FIG. 3E is a diagram of an example embodiment of a graphical user interface that illustrates a reduced or zoomed out view of visual objects. Whereas the example embodiments of FIGS. 3A-D illustrated a zoomed in virtual whiteboard having visual objects serve as the whiteboard themselves, the example embodiment of FIG. 3E illustrates a zoomed out view of the virtual whiteboard 202. As shown in FIG. 3E, the children objects 206, 212 of parent object 204 have been resized and re-scaled to reflect that they are children of the parent object 204. Thus, the visual modeling tool offers a user the ability to hierarchically associate visual objects in a modeling environment capable of unlimited zoom and infinite drawing area.

Figure 4A:
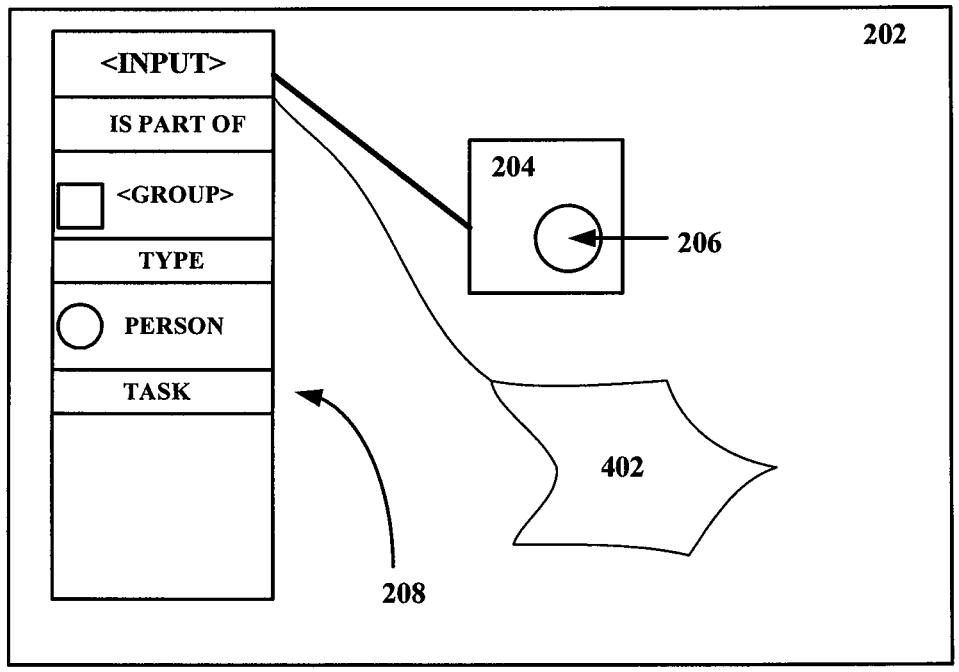
FIG. 4A is a diagram of an example embodiment of a graphical user interface that illustrates the association of multiple alternate visual objects to a set of properties.

FIG. 4A is a diagram of an example embodiment of a graphical user interface that illustrates the association of multiple alternate visual objects to a set of properties. Referring to FIG. 4A, a square 204, such as the square previously discussed and illustrated in FIGS. 2A-D and 3A-E, may be associated with a data object having data object properties, as embodied in a fact sheet 208. The square 204 may have a child object, shown by the circle 206. A user may use a drawing tool to input an enclosed graphical shape 402. The graphical shape 402 may represent a workflow element, such as a process. The user may connect the graphical shape 402 to the data object fact sheet 208 to denote a relationship between the graphical shape 402 and the data object fact sheet 208.

Figure 4B:
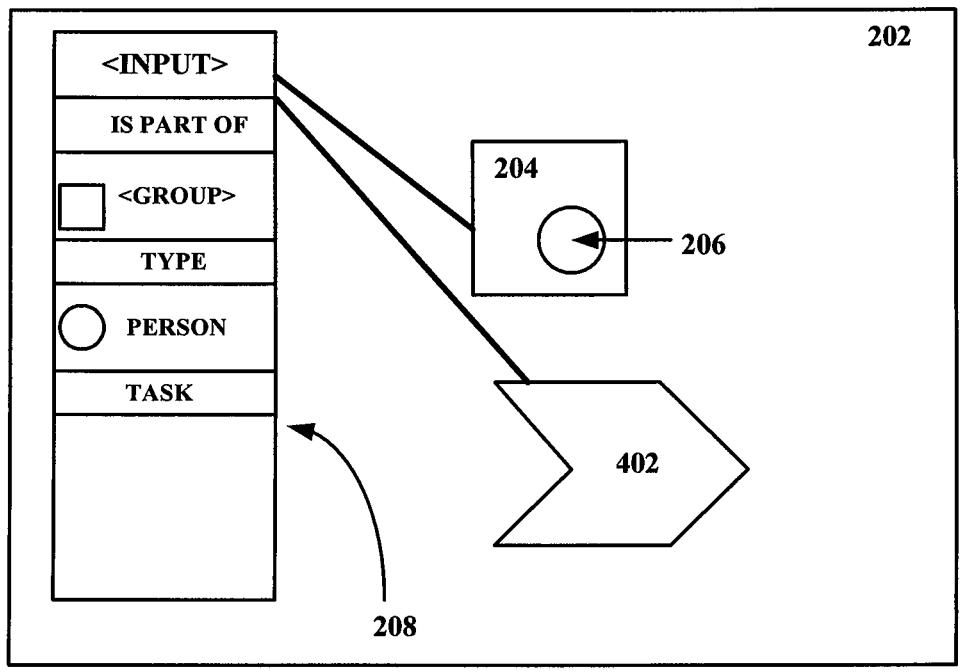
FIG. 4B is a diagram of an example embodiment of a graphical user interface that illustrates the creation of an enclosed graphical shape associated with a set of properties.

FIG. 4B is a diagram of an example embodiment of a graphical user interface that illustrates the creation of an enclosed graphical shape associated with a set of properties. In FIG. 4B, the visual object renderer module 108 may compare the inputted graphical shape 402 with recognized or accepted shapes and render the shape based on the comparison. The association module 112 may associate the graphical shape 402 with the data object represented by the fact sheet 208. The visual modeling module 106 may permit a data object to be represented by multiple visual objects as opposed to a strict one-to-one correspondence between data object and visual object. FIG. 4B illustrates one mechanism by which a visual object may be associated with a data object. Another mechanism for making an association between a visual object and a data object is found in the fact sheet 208. By entering or revising data in the fact sheet 208, a user may change the bindings or relationships between visual objects and the data object.

Figure 5:
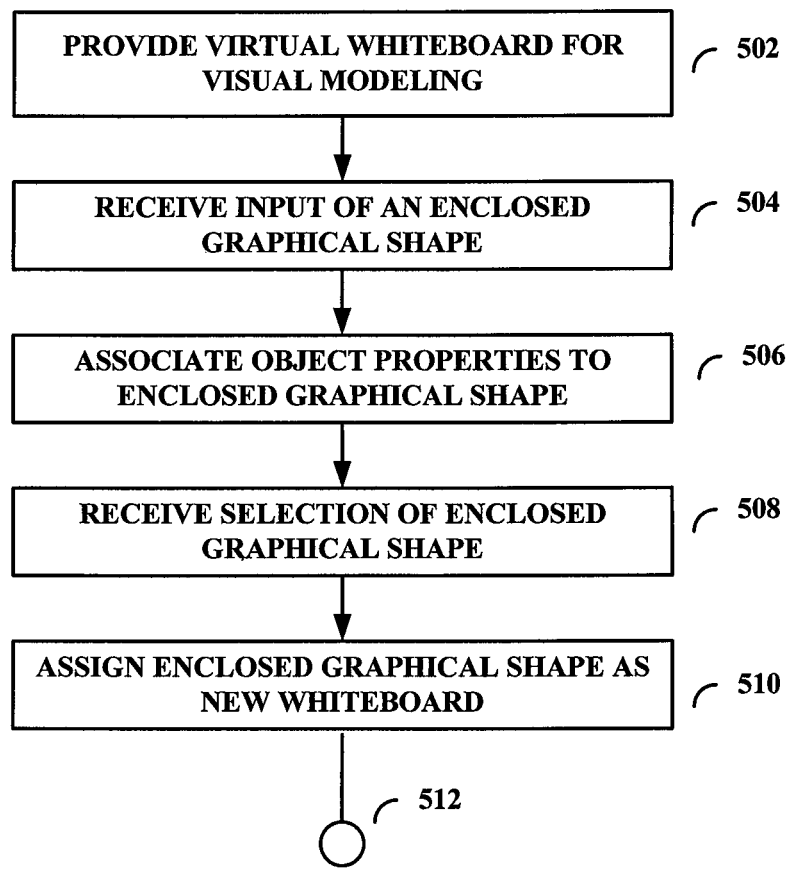
FIG. 5 is a flow diagram of an example method for generating an enclosed graphical shape within a graphical user interface and selecting the enclosed graphical shape to serve as a whiteboard.

FIG. 5 is a flow diagram of an example method for generating an enclosed graphical shape within a graphical user interface and selecting the enclosed graphical shape to serve as a whiteboard. At operation 502, a virtual whiteboard may be provided by a visual modeling tool or application for use in visual modeling. At operation 504, the visual modeling tool may receive an input of a graphical shape entered on the virtual whiteboard. The visual modeling tool may compare the inputted shape with accepted shapes to determine the intended shape of the input. Once recognized, the visual modeling tool may render and display the shape on the virtual whiteboard. At operation 506, object properties of a formal data object may be associated with the graphical shape. The association may be consummated through a graphical shape (e.g., a line) drawn to connect the graphical shape with a fact sheet representing the data object and listing the data object properties. Alternatively, the graphical shape may be entered in the data object fact sheet as being associated with the data object. At operation 508, the visual modeling tool may receive an input corresponding to a selection of the inputted graphical shape. Selection or snap in of the inputted graphical shape may result in the inputted graphical shape becoming the virtual whiteboard. At operation 510, the selected inputted graphical shape may become the virtual whiteboard, thereby permitting a user to draw or input data within the graphical shape. Data inputted within the graphical shape may be hierarchically related to the graphical shape due to the capability of the visual modeling tool to represent hierarchical relationships among visual elements through nesting or embedding of the visual objects. Even though the inputted graphical shape contains boundaries and physical and logical coordinates, the visual modeling tool may manipulate the boundaries and coordinates such that an infinite drawing area within the graphical shape is provided and an infinite zoom ability is provided. The infinite drawing area may be provided by zooming in on the inputted graphical shape to the point where the boundaries (e.g., edges) of the shape no longer are visible within the displayed area of the whiteboard. An infinite zoom ability may be provided through the normalizing of the displayable whiteboard area (i.e., view port) size and position relative to the inputted graphical shape's size and position. The normalization bypasses the need to represent the absolute position and size of inputted graphical shape.

Figure 6:
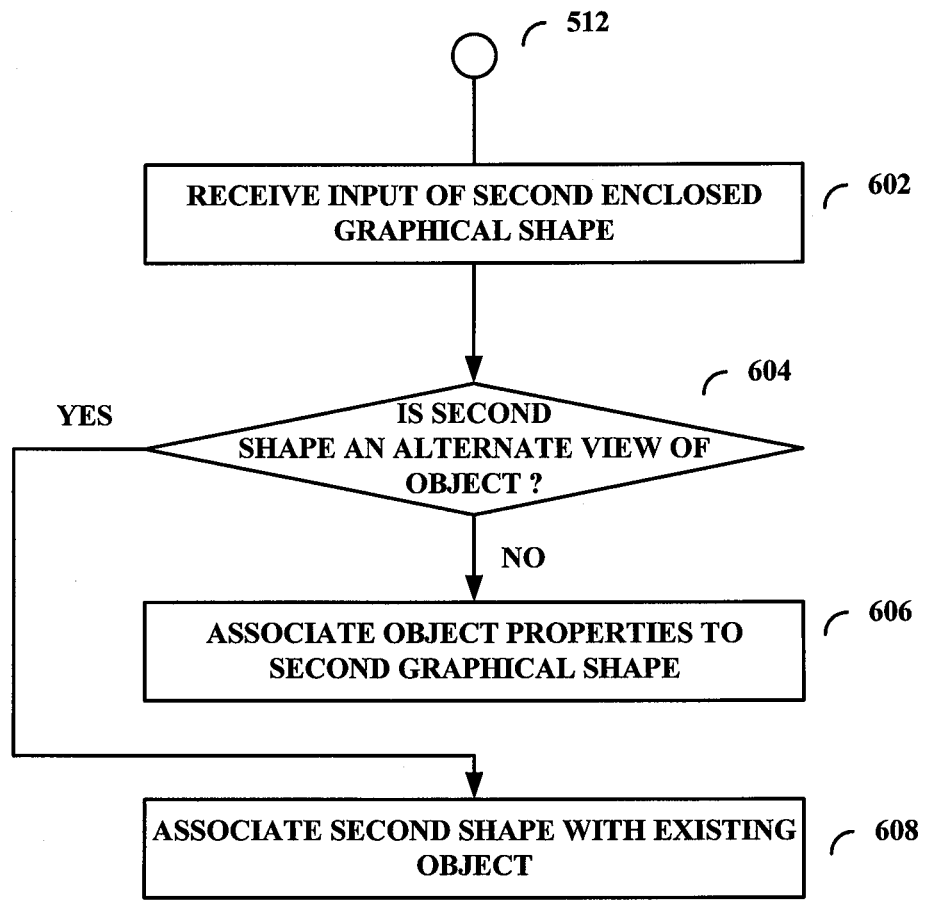
FIG. 6 is a flow diagram of an example method for associating multiple enclosed graphical shapes with a set of properties.

FIG. 6 is a flow diagram of an example method for associating multiple enclosed graphical shapes with a set of properties. The example method of FIG. 6 may continue from the example method of FIG. 5, as indicated by continuation node 512. At operation 602, the visual modeling tool may receive as input a second graphical shape entered on the virtual whiteboard. The virtual whiteboard may be the first graphical shape such that the second graphical shape is inputted within the first graphical shape. At operation 604, a determination is made regarding whether the second inputted graphical shape is an alternate view or visual object for the data object. At operation 606, if the second inputted shape is not an alternate view, the data object may associate the second inputted shape as a sub-element of the first graphical shape. In other words, a hierarchical relationship between the first graphical shape and the second graphical shape is recorded. At operation 608, if the second inputted shape is an alternate view of the data object, the second inputted shape may be associated with the data object as a second visual representation of the data object.

Figure 7:
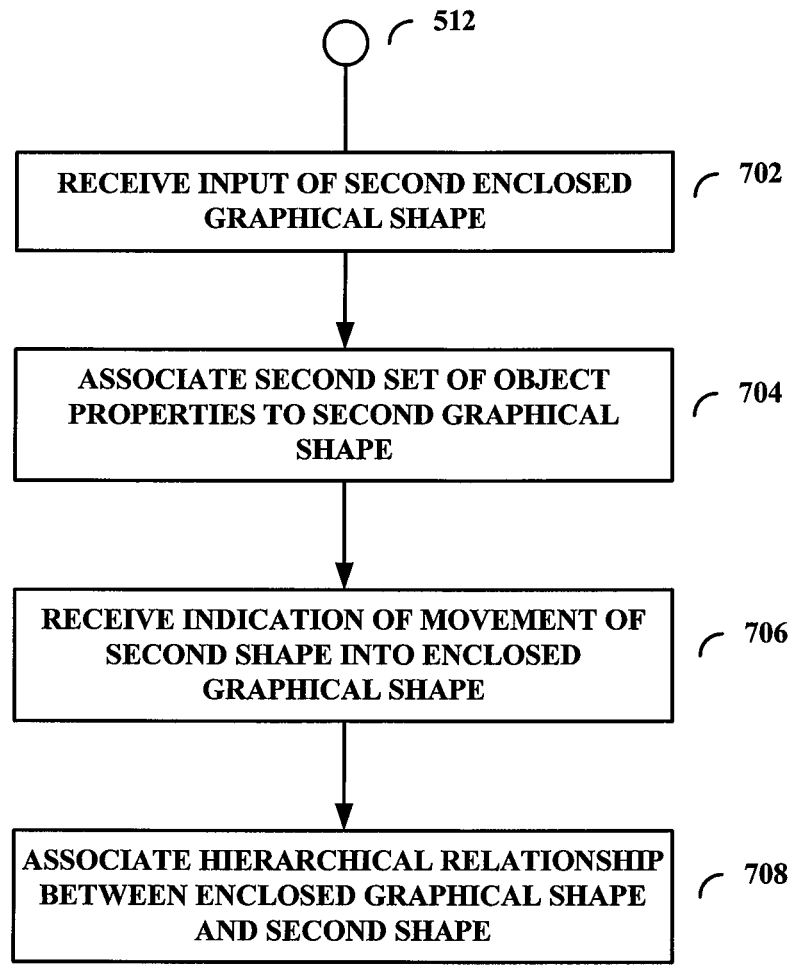
FIG. 7 is a flow diagram of an example method for hierarchically associating an enclosed graphical shape with another enclosed graphical shape.

FIG. 7 is a flow diagram of an example method for hierarchically associating an enclosed graphical shape with another enclosed graphical shape. The example method of FIG. 7 may continue from the example method of FIG. 5, as indicated by the continuation node 512. At operation 702, the visual modeling tool may receive as input a second graphical shape entered on the virtual whiteboard. The second graphical shape may be recognized and rendered on the virtual whiteboard. At operation 704, a second set of object properties may be associated with the second graphical shape. The object properties may be recorded in a fact sheet associated with the data object to which the properties belong. At operation 706, the visual modeling tool may track or receive an indication that the second graphical shape has been moved into the first graphical shape. In an example embodiment, movement may be accomplished through a drag-and-drop operation. At operation 708, a hierarchical relationship corresponding to the movement may be recorded between the first graphical shape and the second graphical shape. In an example embodiment, the coordinates and size of the second graphical shape may be adjusted to reflect the second graphical shape's status in the hierarchy.

Figure 8:
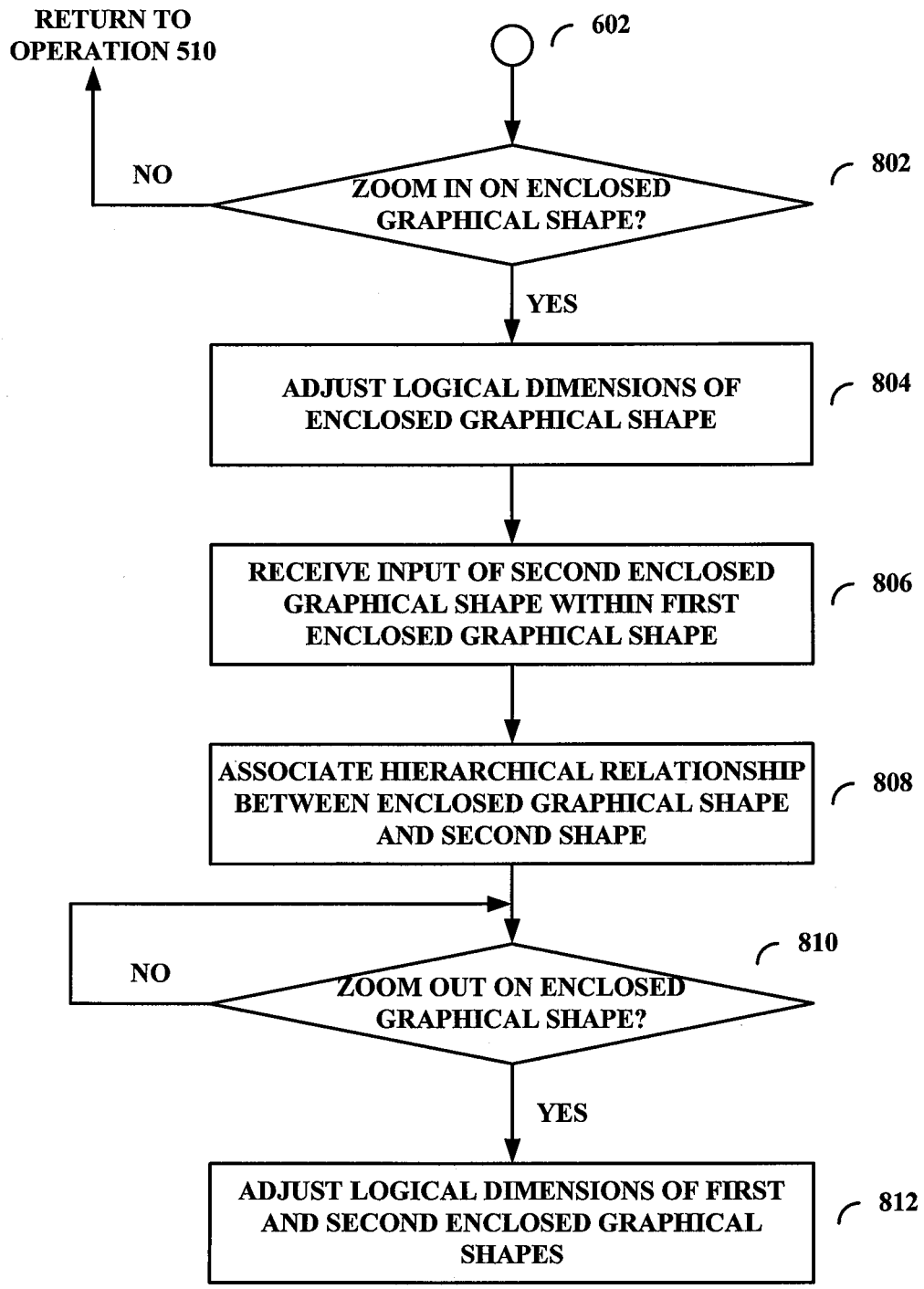
FIG. 8 is a flow diagram of an example method for adjusting the visual scale of an enclosed graphical shape in a graphical user interface.

FIG. 8 is a flow diagram of an example method for adjusting the visual scale of an enclosed graphical shape in a graphical user interface. The example method of FIG. 8 may continue from the example method of FIG. 5, as indicated by the continuation node 512. At operation 802, a determination may be made as to whether a zoom in command has been received for the first graphical shape. If no zoom in command has been received, the example method may return to operation 510 of FIG. 5. If a zoom in command has been received, at operation 804, the visual modeling tool may re-size and re-scale the logical coordinates of the first graphical shape corresponding to a received zoom magnification factor. In an example embodiment, the first graphical shape may be zoomed in to a level where the boundaries of the first graphical shape are no longer visible. In this example embodiment, the first graphical shape may become a virtual whiteboard itself, such that shapes drawn on the virtual whiteboard are actually drawn within the first graphical shape. The first graphical shape operating as a virtual whiteboard may be characterized by an infinite drawing area since the boundaries of the first graphical shape are not visible.

At operation 806, the visual modeling tool may receive input data corresponding to a second graphical shape drawn within the first graphical shape. At operation 808, the second graphical shape may be hierarchically associated with the first graphical shape as a sub-element of the first graphical shape. At operation 810, a determination is made as to whether a zoom out command has been received. If no zoom out command is received, the example method may continue to monitor for a received zoom out command. If a zoom out command is received, at operation 812, the visual modeling tool may calculate the boundaries of the first graphical shape and the logical coordinates of the first graphical shape and the second graphical shape. Because the first graphical shape had an infinite drawing area when serving as a virtual whiteboard, the visual modeling tool performs calculations to determine the size and location of the second graphical shape within the first graphical shape. The scale of the child object (e.g., the second graphical shape) may be automatically determined to fit the child object within the boundaries of the parent object (e.g., the first graphical shape).

Modules, Components and Logic

Certain embodiments are described herein as including logic or a number of components, modules, or mechanisms. A component or a module is a non-transitory and tangible unit capable of performing certain operations and may be configured or arranged in a certain manner. In example embodiments, one or more computer systems (e.g., a standalone, client or server computer system) or one or more components of a computer system (e.g., a processor or a group of processors) may be configured by software (e.g., an application or application portion) as a component that operates to perform certain operations as described herein.

In various embodiments, a component or a module may be implemented mechanically or electronically. For example, a component or a module may comprise dedicated circuitry or logic that is permanently configured (e.g., as a special-purpose processor) to perform certain operations. A component or a module also may comprise programmable logic or circuitry (e.g., as encompassed within a general-purpose processor or other programmable processor) that is temporarily configured by software to perform certain operations. It will be appreciated that the decision to implement a component or a module mechanically, in dedicated and permanently configured circuitry, or in temporarily configured circuitry (e.g., configured by software) may be driven by cost and time considerations.

Accordingly, the term "component" or "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which components or modules are temporarily configured (e.g., programmed), each of the components or modules need not be configured or instantiated at any one instance in time. For example, where the components or modules comprise a general-purpose processor configured using software, the general-purpose processor may be configured as respective different components or modules at different times. Software may accordingly configure a processor, for example, to constitute a particular component or module at one instance of time and to constitute a different component or module at a different instance of time.

Components or modules can provide information to, and receive information from, other components or modules. Accordingly, the described components or modules may be regarded as being communicatively coupled. Where multiple of such components or modules exist contemporaneously, communications may be achieved through signal transmission (e.g., over appropriate circuits and buses) that connect the components or modules. In embodiments in which multiple components or modules are configured or instantiated at different times, communications between such components or modules may be achieved, for example, through the storage and retrieval of information in memory structures to which the multiple components or modules have access. For example, one component or module may perform an operation, and store the output of that operation in a memory device to which it is communicatively coupled. A further component or module may then, at a later time, access the memory device to retrieve and process the stored output. Components or module may also initiate communications with input or output devices, and can operate on a resource (e.g., a collection of information).

Example Machine Architecture and Machine-Readable Medium

Figure 9:
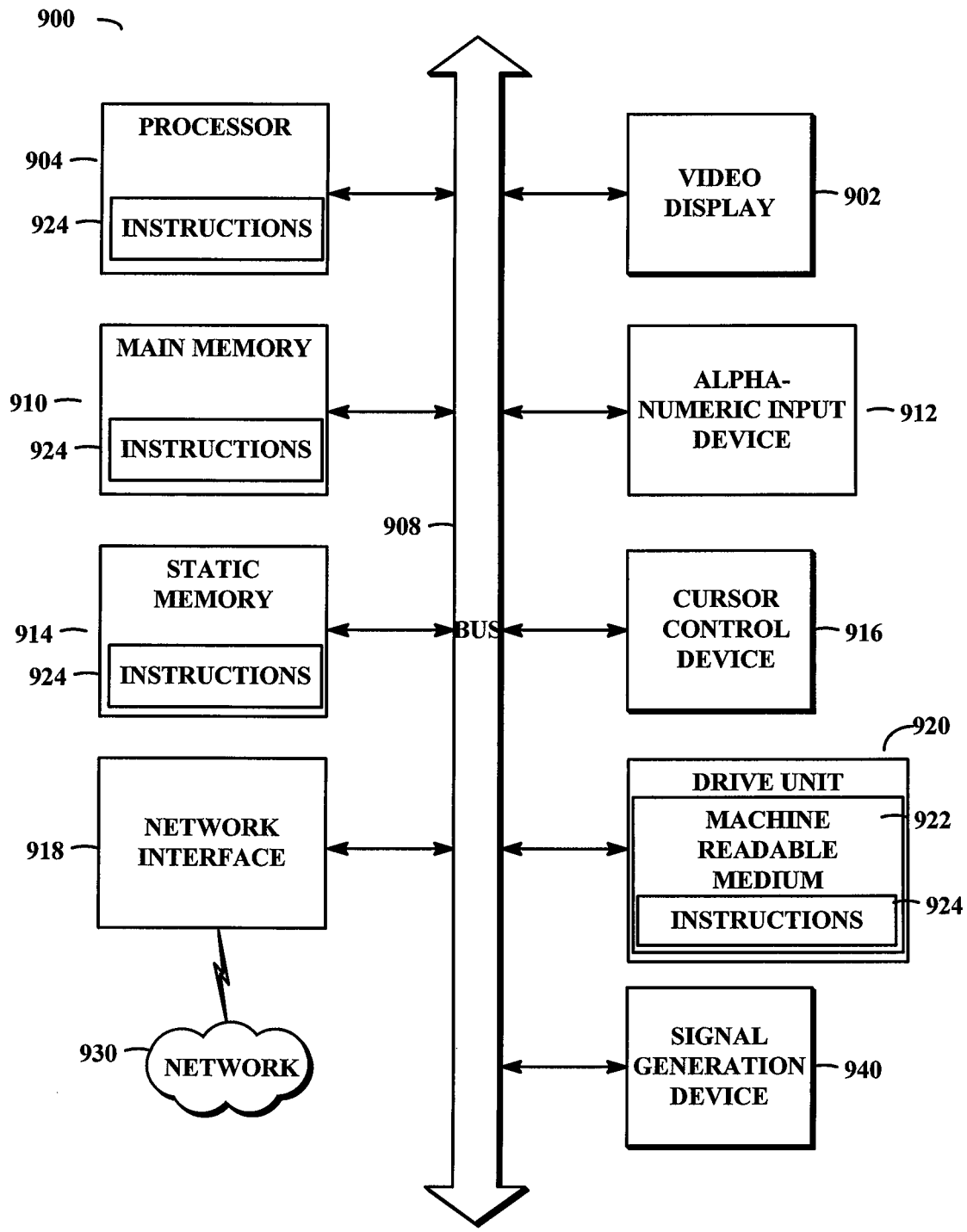
FIG. 9 illustrates a diagrammatic representation of machine in the example form of a computer system within which a set of instructions, for causing the machine to perform any one or more of the methodologies discussed herein, may be executed.

FIG. 9 illustrates a diagrammatic representation of machine in the example form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client device or machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes at least one processor 904 (e.g., a central processing unit (CPU), a graphics processing unit (GPU) or both), a main memory 910 and a static memory 914, which communicate with each other via a bus 908. The computer system 900 may further include a video display unit 902 (e.g., a liquid crystal display (LCD) or a cathode ray tube (CRT)). The computer system 900 also includes an alphanumeric input device 912 (e.g., a keyboard), a user interface (UI) navigation device 916 (e.g., a mouse), a disk drive unit 920, a signal generation device 940 (e.g., a speaker) and a network interface device 918.

The disk drive unit 920 includes a machine-readable medium 922 on which is stored one or more sets of instructions and data structures (e.g., software 924) embodying or utilized by any one or more of the methodologies or functions described herein. The software 924 may also reside, completely or at least partially, within the main memory 910 and/or within the processor 904 during execution thereof by the computer system 900, the main memory 910 and the processor 904 also constituting machine-readable media.

While the machine-readable medium 922 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible or non-transitory medium that is capable of storing, encoding or carrying instructions for execution by the machine and that cause the machine to perform any one or more of the methodologies of the disclosure, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example, semiconductor memory devices, e.g., EPROM, EEPROM, and flash memory devices; magnetic disks such as internal hard disks and removable disks; magneto-optical disks; and CD-ROM and DVD-ROM disks.

Transmission Medium

The software 924 may further be transmitted or received over a communications network 930 using a transmission medium. The software 924 may be transmitted using the network interface device 918 and any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi and WiMax networks). The term "transmission medium" shall be taken to include any intangible medium that is capable of storing, encoding or carrying instructions for execution by the machine, and includes digital or analog communications signals or other intangible medium to facilitate communication of such software.

Example Three-Tier Software Architecture

In some embodiments, the described methods may be implemented using one of a distributed or non-distributed software application designed under a three-tier architecture paradigm. Under this paradigm, various parts of computer code (or software) that instantiate or configure components or modules may be categorized as belonging to one or more of these three tiers. Some embodiments may include a first tier as an interface (e.g., an interface tier). Further, a second tier may be a logic (or application) tier that performs application processing of data inputted through the interface level. The logic tier may communicate the results of such processing to the interface tier, and/or to a backend, or storage tier. The processing performed by the logic tier may relate to certain rules, or processes that govern the software as a whole. A third, storage tier, may be a persistent storage medium, or a non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. The three-tier architecture may be implemented using one technology, or, a variety of technologies. The example three-tier architecture, and the technologies through which it is implemented, may be realized on one or more computer systems operating, for example, as a standalone system, or organized in a server-client, peer-to-peer, distributed or so some other suitable configuration. Further, these three tiers may be distributed between more than one computer systems as various components.

Components

Example embodiments may include the above-described tiers, and processes or operations about constituting these tiers may be implemented as components. Common to many of these components is the ability to generate, use, and manipulate data. The components, and the functionality associated with each, may form part of standalone, client, server, or peer computer systems. The various components may be implemented by a computer system on an as-needed basis. These components may include software written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique.

Software for these components may further enable communicative coupling to other components (e.g., via various Application Programming interfaces (APIs)), and may be compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above-described components across a distributed programming environment as distributed computing components. For example, an interface component (e.g., an interface tier) may form part of a first computer system that is remotely located from a second computer system containing a logic component (e.g., a logic tier). These first and second computer systems may be configured in a standalone, server-client, peer-to-peer, or some other suitable configuration. Software for the components may be written using the above-described object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Example embodiments may use the OSI model or TCP/IP protocol stack model for defining the protocols used by a network to transmit data. In applying these models, a system of data transmission between a server and client, or between peer computer systems may for example include five layers comprising: an application layer, a transport layer, a network layer, a data link layer, and a physical layer. In the case of software, for instantiating or configuring components, having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

It will be readily understood to those skilled in the art that various other changes in the details, material, and arrangements of the parts and method stages which have been described and illustrated in order to explain the nature of the inventive subject matter may be made without departing from the principles and scope of the inventive subject matter as expressed in the subjoined claims.

What is claimed is:

1. A computer-implemented method comprising:
receiving a first user input corresponding to a first graphical shape having first boundaries, a first size, and a first position on an initial virtual whiteboard occupying a display area of a user interface, the first position being stored as a position within the initial virtual whiteboard;
assigning the first graphical shape to represent a first structured data object on the initial virtual whiteboard;
receiving a second user input corresponding to a second graphical shape having second boundaries, a second size, and a second position within the first graphical shape designated as the current virtual whiteboard, the second position being stored as a position within the first graphical shape, the second graphical shape being hierarchically one level below the first graphical shape; and
receiving a third user input corresponding to a third graphical shape on the initial virtual whiteboard; and
based on a determination that the third graphical shape is hierarchically equal to the first graphical shape, assigning, by the processor, the third graphical shape to represent a second structured data object on the initial virtual whiteboard.

2. The computer-implemented method of claim 1, further comprising:
displaying structured object properties in an editable data structure within the user interface display area of the initial virtual whiteboard, the editable data structure occupying a fixed location in the user interface display area; and
recording the assigning of the first graphical shape to represent the structured data object in the editable data structure.

3. The computer-implemented method of claim 1, wherein the assigning of the first graphical shape to represent the structured data object comprises detecting a line drawn from the first graphical shape to an editable data structure representing the structured data object.

4. The computer-implemented method of claim 1, further comprising:
detecting a movement in the user interface display area of the initial virtual whiteboard of a fourth graphical shape from outside of the first graphical shape to inside of the first graphical shape; and
recording the fourth graphical shape as a sub-element of the first graphical shape in an editable data structure that stores graphical shapes and relationships between the graphical shapes, the editable data structure occupying a fixed location in the user interface display area.

5. The computer-implemented method of claim 1, wherein the first user input is generated using a freeform drawing tool, and wherein the first graphical shape corresponds to the first user input by comparing the first user input to stored visual objects and identifying a visual object most closely matching the first user input.

6. A non-transitory machine-readable medium storing a set of instructions that, when executed by at least one processor, causes the at least one processor to perform operations comprising:
receiving a first user input corresponding to a first graphical shape having first boundaries, a first size, and a first position on an initial virtual whiteboard occupying a display area of a user interface, the first position being stored as a position within the initial virtual whiteboard;
assigning the first graphical shape to represent a first structured data object on the initial virtual whiteboard;
receiving a second user input corresponding to a second graphical shape having second boundaries, a second size, and a second position within the first graphical shape designated as the current virtual whiteboard, the second position being stored as a position within the second graphical shape, the second graphical shape being hierarchically one level below the first graphical shape;

receiving a third user input corresponding to a third graphical shape on the initial virtual whiteboard; and based on a determination that the third graphical shape is hierarchically equal to the first graphical shape, assigning the third graphical shape to represent a second structured data object on the initial virtual whiteboard.

7. The non-transitory machine-readable medium of claim 6, further comprising:

displaying structured object properties in an editable data structure within the user interface display area of the initial virtual whiteboard, the editable data structure occupying a fixed location in the user interface display area; and recording the assigning of the first graphical shape to represent the structured data object in the editable data structure.

8. The non-transitory machine-readable medium of claim 6, wherein the assigning of the first graphical shape to represent the structured data object comprises detecting a line drawn from the first graphical shape to an editable data structure representing the structured data object.

9. The non-transitory machine-readable medium of claim 6, further comprising:

detecting a movement in the user interface display area of the initial virtual whiteboard of a fourth graphical shape from outside of the first graphical shape to inside of the first graphical shape; and recording the fourth graphical shape as a sub-element of the first graphical shape in an editable data structure that stores graphical shapes and relationships between the graphical shapes, the editable data structure occupying a fixed location in the user interface display area.

10. The non-transitory machine-readable medium of claim 6, wherein the first user input is generated using a freeform drawing tool, and wherein the first graphical shape corresponds to the first user input by comparing the first user input to stored visual objects and identifying a visual object most closely matching the first user input.

11. A system, comprising:

a memory;

a processor-implemented visual object renderer module coupled to the memory and configured to:

receive a first user input corresponding to a first graphical shape having first boundaries, a first size, and a first position on an initial virtual whiteboard occupying a display area of a user interface, the first position being stored as a position within the initial virtual whiteboard;

a processor-implemented association module configured to:

assign the first graphical shape to represent a structured data object on the initial virtual whiteboard;

the processor-implemented visual object renderer module further configured to:

receive a second user input corresponding to a second graphical shape having second boundaries, a second size, and a second position within the first graphical shape designated as the current virtual whiteboard, the second position being stored as a position within the first graphical shape, the second graphical shape being hierarchically one level below the first graphical shape; and receive a third user input corresponding to a third graphical shape on the initial virtual whiteboard; and the processor-implemented association module further configured to:

based on a determination that the third graphical shape is hierarchically equal to the first graphical shape, assign the third graphical shape to represent a second structured data object on the initial virtual whiteboard.

12. The system of claim 11, further comprising a processor-implemented formal model generator module configured to:

generate an editable data structure for displaying structured object properties on the virtual whiteboard user interface, the editable data structure occupying a fixed location in the virtual whiteboard user interface, wherein the processor-implemented association module is further configured to record the assigning of the first graphical shape to represent the structured data object in the editable data structure.

13. The system of claim 11, wherein the processor-implemented association module is further configured to assign the first graphical shape to represent the structured data object by detecting a line drawn from the first graphical shape to an editable data structure representing the structured data object.

14. The system of claim 11, wherein the processor-implemented visual object renderer module is further configured to:

detect a movement in the user interface display area of the initial virtual whiteboard of a fourth graphical shape from outside of the first graphical shape to inside of the first graphical shape; and wherein the processor-implemented association module is further configured to:

record the fourth graphical shape as a sub-element of the first graphical shape in an editable data structure that stores graphical shapes and relationships between the graphical shapes, the editable data structure occupying a fixed location in the user interface display area.

* * * * *